Fig. 1

HANS IVAR WALLSTEN
INVENTOR.

Aug. 2, 1966          H. I. WALLSTÉN          3,263,391

METHOD OF MANUFACTURING PACKAGES

Filed May 3, 1963          11 Sheets-Sheet 6

HANS IVAR WALLSTEN
INVENTOR.

BY *Albert M. Parker*
ATTORNEY.

HANS IVAR WALLSTEN
INVENTOR.
BY
ATTORNEY

HANS IVAR WALLSTEN
INVENTOR.

United States Patent Office 3,263,391
Patented August 2, 1966

3,263,391
METHOD OF MANUFACTURING PACKAGES
Hans Ivar Wallstén, Dals-Langed, Sweden
Filed May 3, 1963, Ser. No. 277,918
17 Claims. (Cl. 53—28)

The present invention relates to a method for manufacturing, and if desired also filling, package having a substantially square cross-section, and for example made of paper or similar material. A web of this material is shaped around a substantially square shaping body, the longitudinal edges of the material of the web being sealed to each other and the substantially square package element thus formed being folded at the end of said shaping body and tightly sealed. One object of the invention is to provide a bottom-seal at the substantially square package under production, the four side-walls of which entirely or partially surround the square shaping body, at the same time as a top-seal is provided at the next package the bottom of which has been shaped and sealed in a previous folding and sealing operation, whereupon the package element is displaced along the square shaping body a suitable distance, in accordance to the desired height of the package, and a new folding- and sealing operation initiates.

The invention also relates to a method to produce a square package, which can be placed stably on its bottom and which is severed between the shaped bottom of a first package and the top of the next package in succession in connection with the above stated folding- and sealing operation. A projecting lap on the bottom-seal, formed as a consequence of the severing, is prevented from tipping the package when the latter is placed on a plane surface, in that the bottom of the package, suitably in connection with the folding, sealing and severing operation is recessed and/or said lap is bent laterally after the severing.

The invention also relates to a method for filling desired material into the packages thus produced, by introducing said material, through the above mentioned substantially square and suitably hollow shaping body, into the package the bottom of which just has been shaped and sealed, preferably in connection with or immediately after said displacement of the package element.

The packages manufactured according to the above stated method can be filled with liquid, for example, such as milk which will fill up the package entirely. The liquid is introduced through the shaping body into the package the bottom of which just has been shaped or is being shaped, and the liquid is kept at a level, which at least during the folding and sealing process exceeds the top edge of the package the top-seal of which is being shaped in the folding- and sealing procedure.

As a result of the above stated special folding and sealing process there is obtained a liquid-tight top-seal, which can be opened by the consumer in a simple manner without using a tool, such as scissors or knife, and in connection with the opening said top-seal can form a projecting lip or beak to facilitate the pouring out of the packaged material, e.g. the liquid.

The folding and sealing process can be carried out by providing the paper web or the like with a first embossing or stamping pattern, entirely or partially corresponding to the lines along which the paper is to be folded by suitable folding means, and with a second embossing or stamping pattern for facilitating the formation of a projecting lip or beak, when the top of the package is opened.

Preferably the substantially square packages produced according to the invention, have a substantially square bottom and are liquid-tight and easy to open. In the manufacturing process the packages are formed, filled, sealed and severed continuously. The process has shown to be especially suitable for the manufacture of packages of relatively thick material, for instance plastic-coated cardboard or pasted products. For the packaging of milk, for example, it has been proved to be suitable to use a cardboard of a surface weight of approximately 150 g./m.², the inside of which is coated with plastic material of approximately 40 g./m.², polyethylene, for example. The plastic material serves as a liquid-tight internal layer on the inner side of the carton and as a heat sealing material at the sealing operation. Of course, the internal coating of the paper does not necessarily need to be of the heat-sealing type. Thus, the internal layer can also be suitable for cold-sealing, for example cohesive coating.

Due to their shape, the packages produced are well suited for modern distribution. They can be piled in uprised or lying position.

The invention is illustrated by some embodiments in the accompanying drawings.

Figure 1:
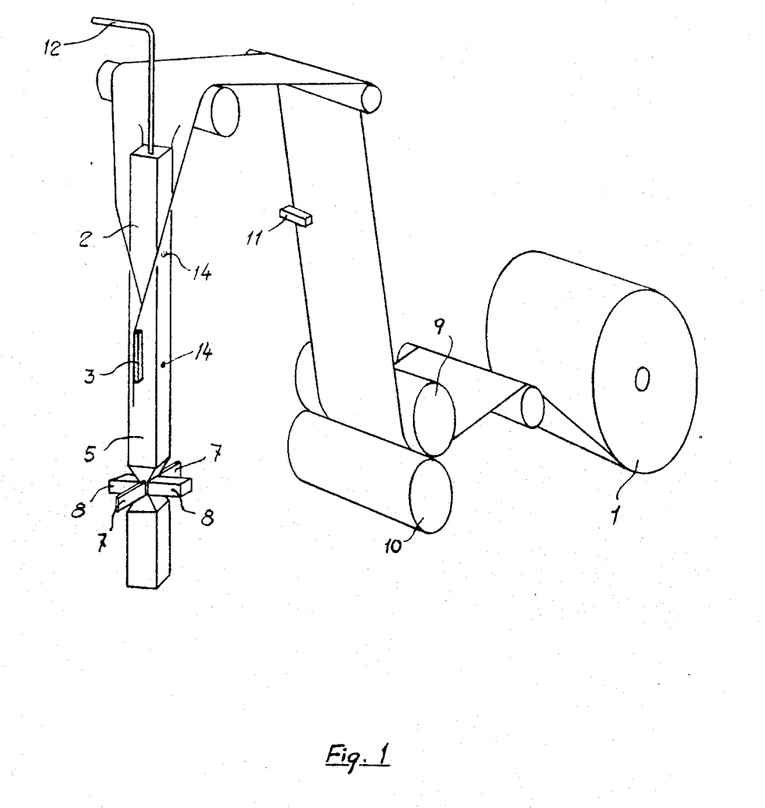
FIG. 1 shows diagrammatically one example of carrying-out of the invention.

According to the embodiment shown in FIG. 1, a square paper element is produced from a web of paper or the like, which is rolled-off from a roll 1 and shaped around a shaping body 2 having a square or approximately quadratic cross-section. The longitudinal edges of the paper web are sealed to each other, for instance by means of a sealing jaw 3. If the sealing is effected on overlapping edges of the paper web, an improved tightening can be achieved by placing a ribbon of plastic material over the longitudinal joint in a known manner. At the end of the square shaping body 2 the square paper element 5 thus formed is folded and sealed by means of two pairs of folding and sealing jaws 7 and 8. Both pairs of jaws work in a plane perpendicular to the symmetrical axis of the square paper element 5 and the direction of the operative stroke of the pair of jaws 7 is perpendicular to that of the pair of jaws 8. In the special folding and sealing process to be described, also the working plane of the pairs of jaws is displaced relative to the lower end of the square shaping body 2, either by displacing the working plane of the pairs of jaws upwardly or by displacing the square package element and the square shaping body downwardly, in both cases for the purpose of folding-in the bottom laps or flaps.

FIG. 1 also shows embossing-means, for instance comprising an embossing roller 9 and a counter pressure roller 10, to be used in order to impart to the paper web an embossing pattern entirely or partly corresponding to the lines along which the paper is to be folded in order to form the package element. The embossing is not necessary under all conditions for carrying out the invention, but facilitates the folding, especially when thick material is involved. It is not necessary to carry out the embossing in the packaging machine, but also an already embossed material can be used with advantage.

In order to assure a correct feeding and guiding of the paper web, the device according to FIG. 1 can be provided with register means 11, which can be of optical or mechanical type, for example. The filling of the packages produced can take place through the hollow shaping body 2 and for this purpose FIG. 1 shows a filling-conduit 12.

Figure 2A:
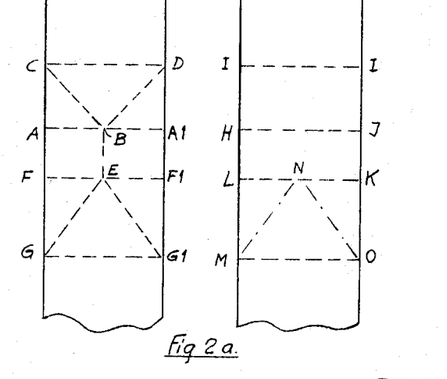
FIGS. 2a, 2b, 2c, 2d and 2e illustrate several steps of the folding process.

FIG. 2a shows examples of patterns of folding lines impressed into the paper web. The folding is effected along these lines by means of the pairs of jaws 7 and 8 in FIG. 1. To the left in FIG. 2a there is shown the folding pattern for the two opposite sides of the square package element against which the narrow pairs of jaws 7 operate, and to the right there is shown the folding pattern for the two opposite sides against which the broad pairs of jaws 8 operate. The two opposite pairs of the faces of the paper web laid around the square shaping body 2 have four parallel folding-lines, namely two outer C–D, G–G1 and I—I, M–O, respectively, and two inner A–A1, F–F1 and H–J, L–K, respectively. One pair of faces has also triangular folding-lines C B D and G E G1 with the apexes placed on the lines A–A1 and F–F1, respectively, and the bases formed by the lines C–D and G–G1, respectively. The dash-dot lines MN and ON at the right illustrate a suitable triangular embossing pattern to facilitate the shaping of a projecting beak, when the top of the package is opened. The triangle M N O can be slightly open at its top, as indicated in the drawing. In the folding process the narrow jaws 7 arranged opposite each other will substantially touch the square package element along the centre line B–E only, whilst the broad jaws 8 arranged opposite each other substantially will touch the central position H–J–K–L or parts thereof. The folding proper is effected by moving both pairs of jaws 7 and 8 in FIG. 1 simultaneously inwardly and upwardly towards the center of the square package element and in a plane perpendicular to the longitudinal or symmetrical axis of the square package element. The upward movement can be replaced by a corresponding downward movement of the square package element and the square shaping body.

Figure 2B:
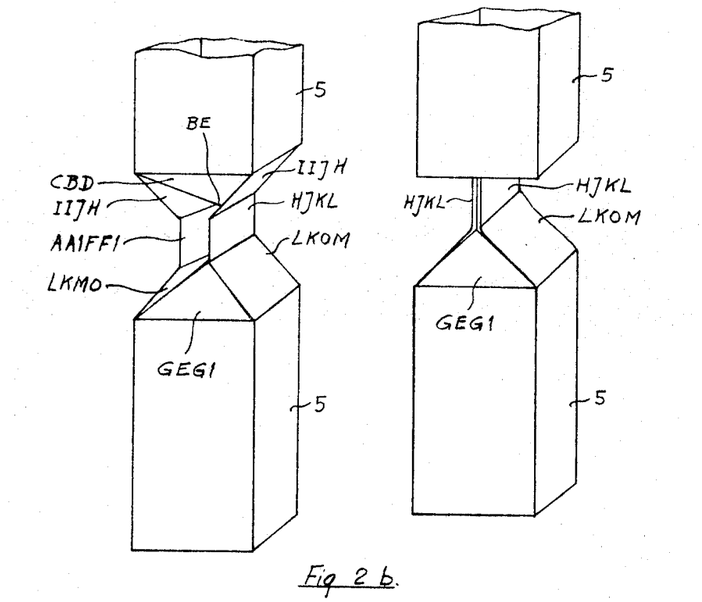

The folding step is illustrated in FIG. 2b. When the folding is finished (at right in FIG. 2b) it is important that the fold formed along the line B E has contact with the corresponding fold along the line B E at the opposite face of the square package element. This is achieved by shaping the square package element with a square (quadratic) cross-section. The folding process described results in folding of the bottom of the square package to be produced, the four walls of which entirely or partially surrounding the square shaping body, at the same time as a top folding is effected for that package, the bottom of which has been shaped in a previous folding and sealing operation. It is apparent, that said bottom folding results in a plan quadratic bottom, if the distance C–A between the folding lines C–D and A–A1 intended for the bottom is equal to the distance A B, which again is the half distance A–A1 or C–D. The projecting character of the top is determined by selecting the distance F–G between the folding lines F–F1 and G–G1 intended for the top, larger to a greater or smaller extent in relation to the distance F–E, which is half the distance F–F1.

Figure 2C:
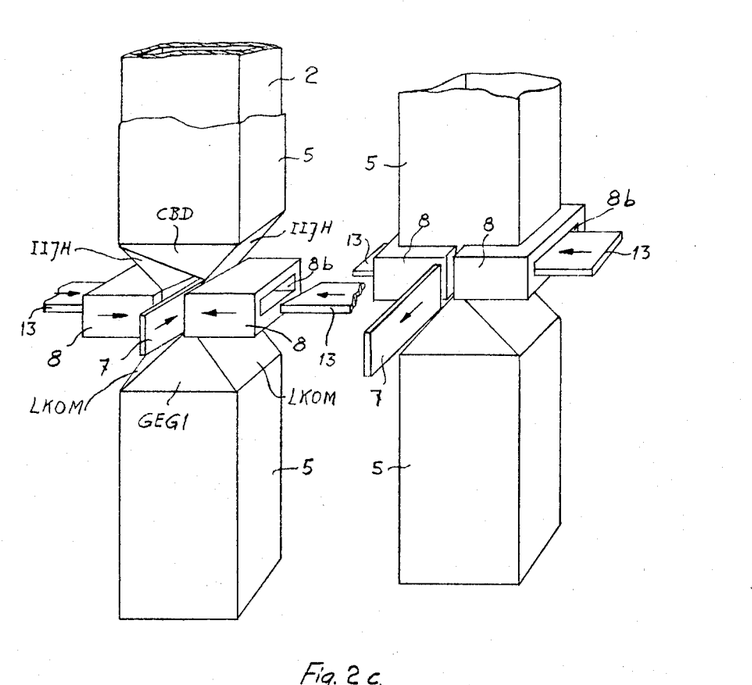

FIG. 2c shows the folding step with the pairs of jaws 7 and 8 in operation. To the left there are shown the pairs of jaws at their inward and upward movement relative to the lower end of the square shaping body 2, and to the right there is shown the final position of the folding step, in which the jaws 8 are forced against each other and the jaws 7 already are on their way back to their initial position so as in this manner to permit a final compression of the material by means of the pair of jaws 8.

At this stage the folding is completed and the package ready for sealing. If the paper web internally is provided with a heat-sealing material the sealing is effected most simply by providing the pairs of jaws 8 with suitable heat-sealing means. The heat-sealing can be effected over the entire inside of the surfaces H–J–K–L of both opposite faces of the package (at right in FIG. 2a), and said surfaces are forced against each other during the folding step by means of the broad jaws 8, or sealing stripes may be provided substantially parallel to the line H–J in FIG. 2a. Also the pairs of jaws 7 can be heated so as to effect a faster heat-sealing.

Figure 2D:
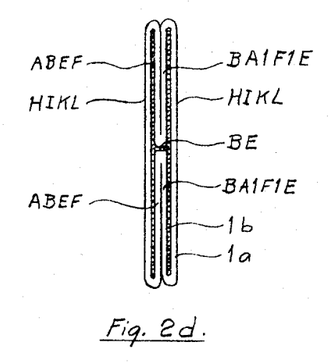
Figure 2E:
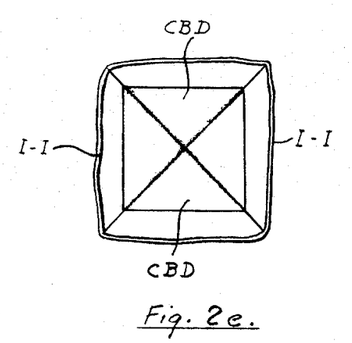

FIG. 2d shows a cross-section in the plane of movement of the pairs of jaws 7 and 8 of the package folded and sealed according to the above described method. For the sake of clarity, the thickness of paper-layer 1a and the plastic layer 1b are shown on an exaggerated scale. It is clear, that the above disclosed folding and sealing process effects an absolutely tight sealing of the bottom as well as of the top. FIG. 2e illustrates the bottom seen from the inside.

Severing of the top thus formed from the bottom is suitably effected by knives in connection with the sealing step. FIG. 2c illustrates a pair of knives 13 displaceable in the same direction and plane as the pair of jaws 8. According to the embodiment of FIG. 2c, there are square cavities 8b in the pairs of jaws 8, permitting the pair of knives 13 by an inward displacement in connection with the sealing operation to cut off the package at the central section H J L K (FIG. 2a).

After having completed the folding, sealing and cutting steps described, the pairs of jaws 7 and 8 as well as the pair of knives 13 can return to their initial positions, whereupon the square paper element travels along the square shaping body a suitable distance according to the desired height of the packing, and a new folding and sealing operation is initiated.

Motion can be imparted to the pairs of jaws 7 and 8 as well as to the pair of knives 13 by driving means of any suitable kind.

The folding and cutting process described results in a projecting lap or flap 20 (FIG. 3a) corresponding approximately to half the length B–E (FIG. 2a) being formed at the bottom 21 of the package. In order to obtain a plane bottom, permitting the package to rest stably on a plane base, the lap 20, as shown in FIGS. 4a, 4b and 3b, can be bent laterally by causing one of the press jaws 8, after the completed sealing and severing operation, to continue its inward movement at the same time as the other, opposite press jaw 8 rapidly is displaced outwardly. In this manner the lap 20 is folded laterally by the first mentioned press jaw (FIGS. 3b and 4b). The lap can be fixed in its position by applying glue, for example of thermoplastic type, on a suitable place at the outside of the package. Such glue-points are shown at 14 in FIGS. 1 and 3b.

Figure 3A:
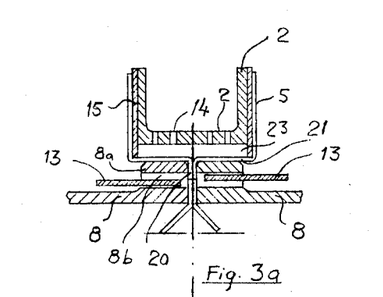
FIGS. 3a, and 3b show how the bottom of the package can be formed.
Figure 3B:
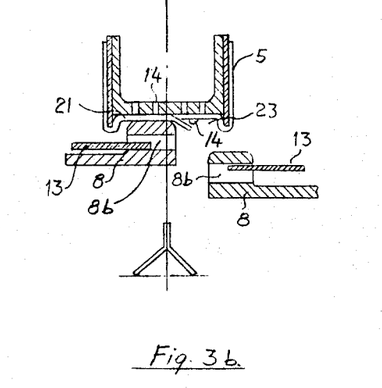
Figure 4A:
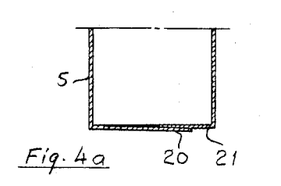
FIGS. 4a, 4b, 4c, 4d, 4e, 4f, 4g and 4h show different embodiments of this bottom.
Figure 4B:
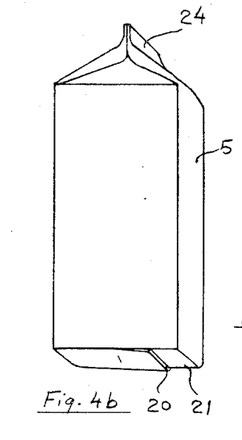
Figure 4C:
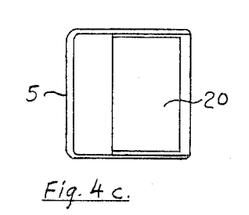
Figures 4D, 4E:
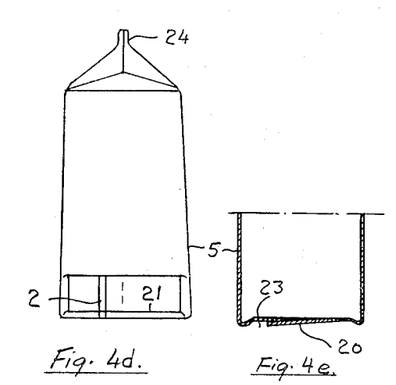
Figure 4F:
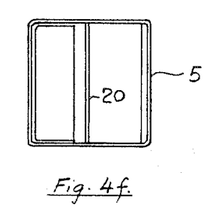
Figure 4G:
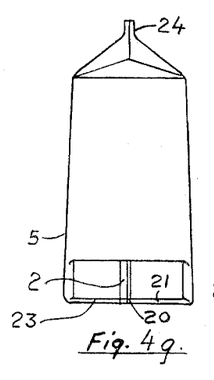
Figure 4H:
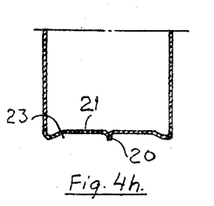
Figure 5A:
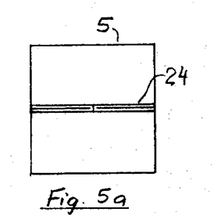
FIGS. 5a, 5b, 5c, 5d, 5e and 5f illustrate how the top of the package can be opened.
Figures 5B, 5C:
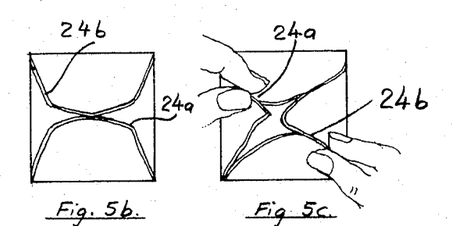
Figure 5D:
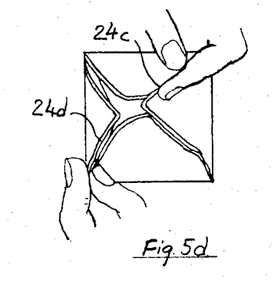
Figure 5E:
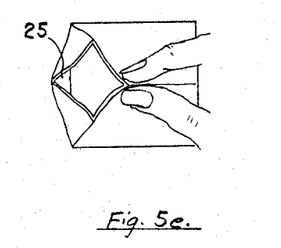
Figure 5F:
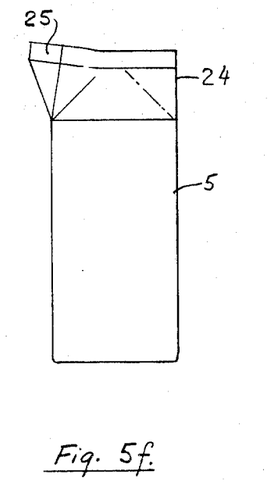

It has been proved to be possible to obtain a package with a very stable bottom by recessing the bottom 21 of the package inwardly at 23 in connection with the folding operation, as shown in FIGS. 3a and 3b. The square shaping body 2 has a recessed bottom 22, perforated at 14, to permit filling of the package. The pairs of press jaws 8 have on the top side 8a a special shape corresponding to the recess 23 in the bottom 22 of the shaping body. The recess of the bottom 21 of the package is formed by forcing the pairs of press jaws 8 upwards when the folding according to FIG. 2c has been completed (FIG. 3a). Obviously a corresponding effect can be achieved by imparting a corresponding downward movement to the shaping body 2. Although FIG. 3b shows an embodiment with recessed bottom but the process now described can also be applied to a plane bottom, thus without the recess 23 shown. If the outer wall 15 of the shaping body is adapted displaceably downwardly, the same effect can also be achieved. Due to the recess 23 of the bottom 21 of the package, the projecting lap 20 obtained due to the cutting-off of the package, does not necessarily need to be folded to the side. The shape of the bottom of the package, in this case, is shown in FIGS. 4f–4h.

A package with stable bottom and a very appealing appearance is obtained, if the bottom 21 is recessed according to the method now described and the lap 20 formed at the cutting-off is bent laterally and possibly fixed in similarity with the process now described; see FIGS. 3b and 4c–4e.

The filling of the package is effected by supplying the material to be packaged, for example via the conduit 12 through the square shaping body 2, into that package, the bottom of which has just been shaped and sealed, preferably in connection with or immediately after the paper element having been displaced as aforesaid.

On packaging liquid, for example milk, the liquid can be caused to fill entirely the package by supplying it into the package the bottom of which has just been shaped or is being shaped, via the hollow shaping body 2, while keeping the level of the liquid in the package so high, that at least in the folding and sealing process this level will exceed the top edge of the package, the top-seal of which instant being formed at the same time. By this method of packaging, milk can be packaged and attributed a long storage time, which can be further extended in a known manner by so-called aseptic packaging.

By the folding and sealing process described there is achieved an air and liquid proof top-seal, which in a simple manner can be opened without use of tools. FIG. 5 illustrates how by seizing opposite laps 24a, 24b, 24c, 24d of the top 24 of the package, suitable sections of the seal can be torn, so as to form a projecting beak 25. The opening of the top of the package is facilitated by applying said seal stripewise transversally and carrying out the severing between two such stripes, that is to say in unsealed material.

Referring again to FIG. 2a it should be noted that the distance C–A equal to A–B also is equal to H–I which is half the distance H–J.

Figure 6A:
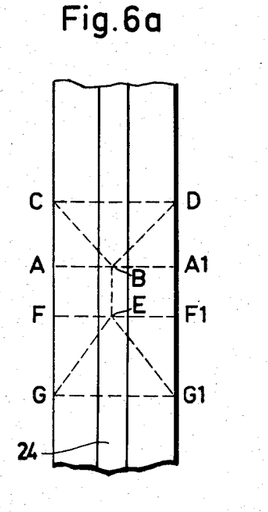
FIGS. 6a and 6b are folding patterns of further embodiments.
Figure 6B:
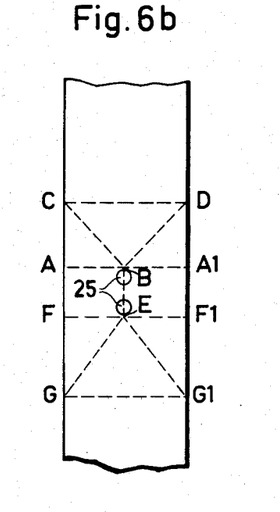

In order to secure an absolutely tight seal also when the sheet material has a poor flexibility an additional ribbon or strip of plastic material can be applied to the internal face of the package element along the line B–E of FIG. 2a and if desired also along the extension of this line in vertical direction. In FIG. 6a which is similar to FIG. 2a this plastic strip is shown at 24. In this manner there will be produced a particularly thick layer of plastic material along the folding lines B–E so as to facilitate contact between said lines in the shaping operation according to FIG. 2d whereby a perfectly tight seal is secured. Obviously, this plastic strip may be rather thin, for instance some few millimeters, for securing the sealing effect aimed at. Preferably the strip may be heat-sealed to the plastic layer of the package by known means. It is also satisfactory to replace the strip by dots 25 of glue as shown in FIG. 6b, such as some suitable type of plastic material, applied along the folding lines B–E on both sides of the subsequent severing line which divides the lines B E into approximately two equal sections. The plastic strip or the plastic dots may also be applied to the two opposite faces, that is to say along a line through the point N in FIG. 2a.

Figure 6C:
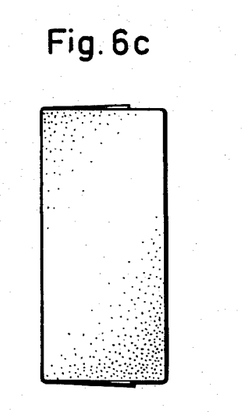
FIGS. 6c and 6d are external views of the package, according to these embodiments.
Figure 6D:
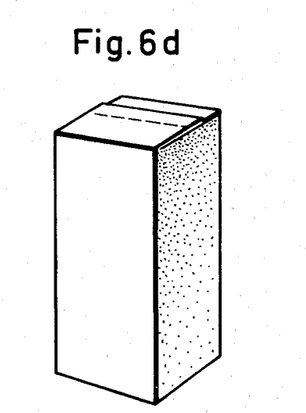

As described with reference to FIGS. 2b to 2e the result of the folding and shaping operation is that there will be provided a top of the package the inclination of which is determined by the difference between the distance F–G and the distance F–E. If F–G is approximately equal to F–E the top will be flat as shown in FIGS. 6c and 6d and also this top is easy to open in substantially the same manner as described with reference to FIGS. 5a to 5e. The upright lap formed also in this type of package can be bent laterally or sideways either in the sealing or severing process or subsequently in a separate operation. By bending the laps laterally or sideways and possibly securing them by glueing or the like the top will be practically plane as shown in FIGS. 6c and 6d, thus facilitating piling of a plurality of packages one on the top of the other.

Figure 7A:
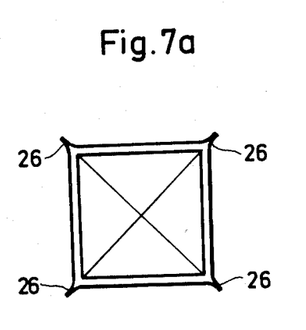
FIGS. 7a and 7b are a diagrammatical cross-section and perspective view, respectively, of a still further embodiment of the package.
Figure 7B:
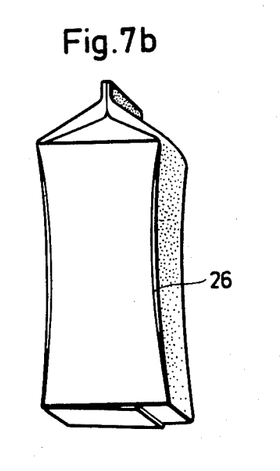

Steps may be taken to produce a package of an extremely good stability. Such steps may be effected in connection with shaping of the package or afterwards. To this purpose one or more of the vertical edge lines of the packages are subjected to a compression or squeezing action simultaneously with the heat-sealing operation so that the corner or corners of the package adjacent to the edge lines will consist of double layers of material. By adjusting this squeezing operation along the edge lines in a suitable manner the package will obtain the desired shape so as to facilitate easy seizing thereof. Thus, the package may be provided with a "waist" by restricting the squeezing action to the central vertical section of the package which will be understood from FIGS. 7a to 7d. In the central cross-section according to FIG. 7a the squeezed portions of the four vertical corner edges are indicated at 26 and are provided by compressing or squeezing particularly the central portions of said vertical corner edges between jaws or the like.

Figure 7C:
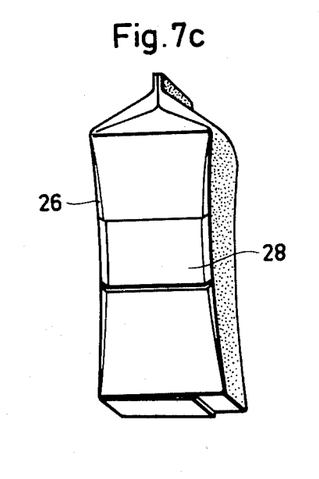
FIGS. 7c and 7d are a perspective view and a diagrammatical cross-section, respectively, of a further embodiment.
Figure 7D:
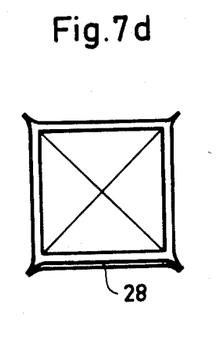

FIGS. 7c and 7d illustrate the effect of a similar squeezing or compressing action but still more restricted to the central vertical section. A further improvement of the stability may be provided by glueing or otherwise attaching a transverse reinforcement, such as a sheet or strip of board or carton or the like 28 to one face of the package between the adjacent pair of double-walled edges 26. If the package thus formed is seized with one hand at the reinforced face, for instance on pouring out liquid from the package the sheet or strip 28 and the double-walled edges 26 will contribute to a very good reinforcement.

The packages according to the invention may be produced at a high speed by means of a twin-arrangement of suitable kind. In the operation of this arrangement two substantially identical web shaping stations or machines are arranged parallel to each other. As a rule the production capacity will be approximately equal to the total production of two separate individual machines. The advantage of the twin arrangement is that some parts of the machines may be common to both machines whereby the costs will be reduced as compared with two individual machines.

To this purpose, according to one embodiment of the invention a web of double width is provided and then divided longitudinally into two sections after the embossing or impressing means 9–10 in FIG. 1. The sections of the web will travel parallel to one another and are each provided with a folding pattern according to FIG. 2a, for instance. By suitably arranging the mutual positions of or space between the shaping bodies 2 or 14 the two webs will be folded so as to permit free operation of the pairs of jaws 7 and 8 (FIG. 1) with associated members for effecting final shaping around the shaping bodies.

Figure 8A:
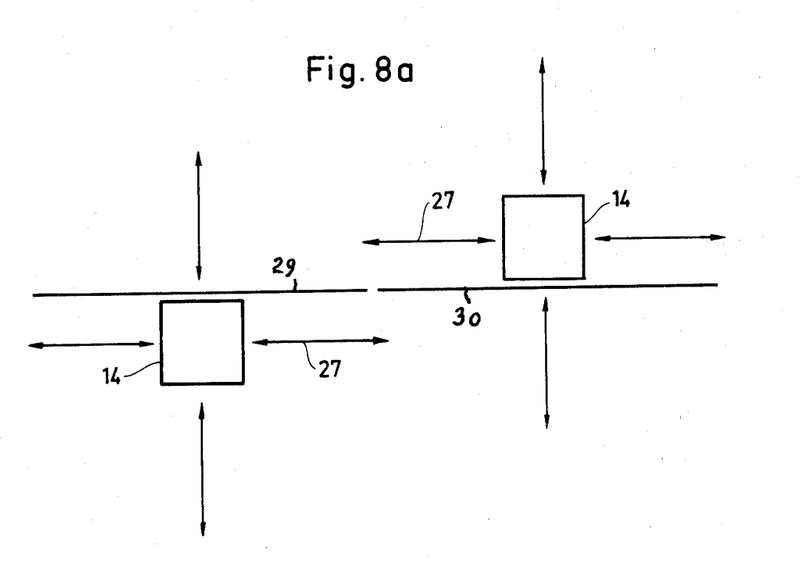
FIGS. 8a, 8b, 8c and 8d illustrate some steps of a modified process of manufacturing a package according to the invention.
Figure 8B:
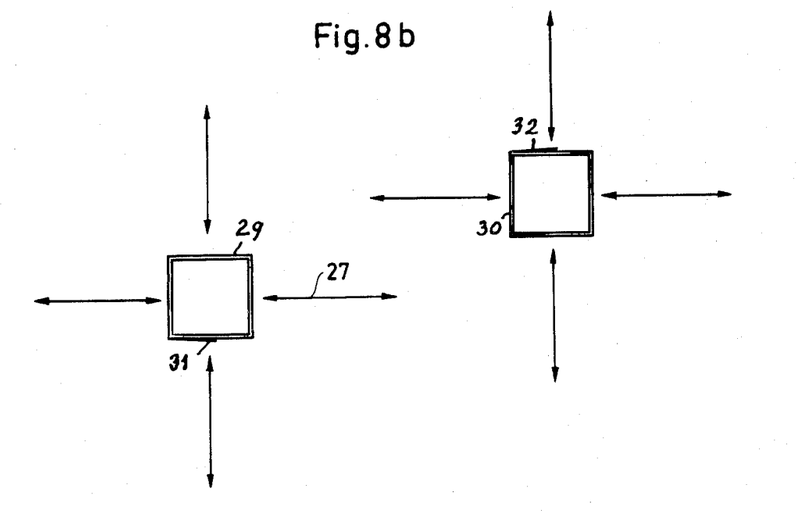
Figure 8C:
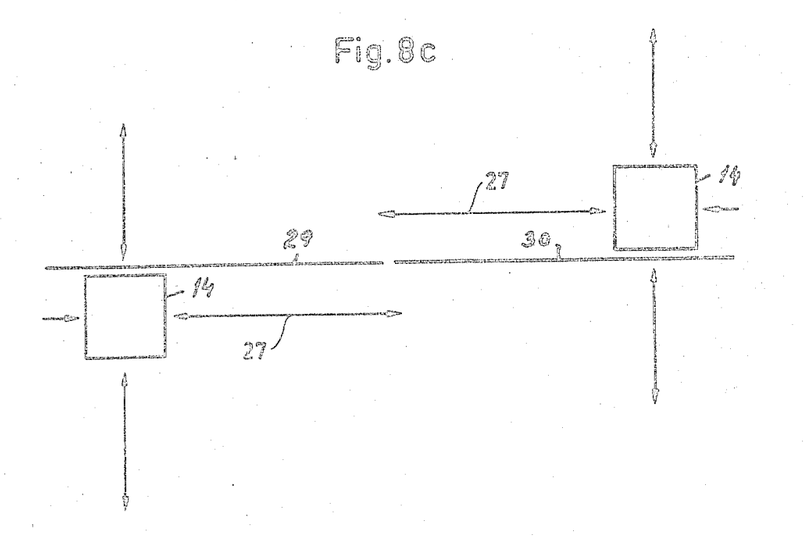
Figure 8D:
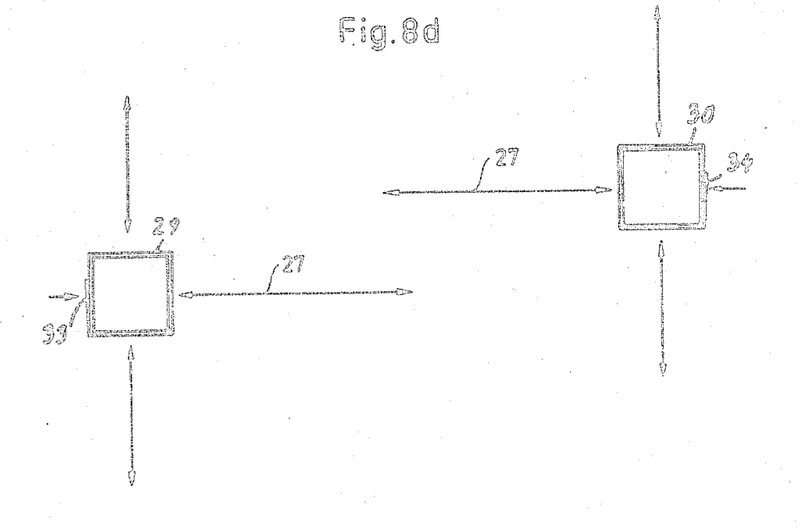

FIGS. 8a, 8b, 8c, 8d show cross-sections at right angles to the vertical central axis of twin-arrangement of this type in which the two sections 29, 30 of the webs are each folded on a shaping body 14 so that the pairs of jaws 7 and 8 (not shown in FIGS. 8a to 8d) will not interfere with one another. In FIGS. 8a to 8d the means for effecting the folding operation of the jaws 7 and 8 are indicated diagrammatically by arrows 27. It is easily seen therefrom that the operative motions according to arrows 27 do not interfere since the vertical shaping bodies 14 have been displaced in relation to one another. FIGS. 8a and 8b show folding of the web sections at the central portions thereof while FIGS. 8c and 8d show an embodiment in which folding initiates adjacent to one end of webs 29, 30. The overlapping joints are shown at 31, 32, 33 and 34 respectively.

In order to improve the rigidity of the package its external faces may be treated so as to present a relatively high friction to the hand when seized, for instance by applying a surface layer of a polyvinylidene chloride dispersion with an addition of small quantities of natural or synthetic latex whereby a rough surface will be obtained which also is water repellent and steam proof.

In order to prevent spilling of liquid from the package on opening the latter the jaws 7 and 8 may be arranged so as to compress one or more of the faces of the package so that they will assume a slightly concave shape. When the package is opened by the consumer the concave face or faces will resume the initial plane shape, thus causing the level of the liquid within the package to sink slightly when air is admitted into the package on opening the same.

Since changes may be made in the method and apparatus now shown and described without departing from the scope of the invention it is intended that all embodiments shall be interpreted as illustrative and not in limiting sense.

What I claim is:

1. A method of producing a package having a substantially rectangular cross-section, comprising the steps of shaping a web of sheet material around a shaping body of rectangular cross-section, sealing the longitudinal edges of said web to each other to form a rectangular tubular package element, folding pair-wise opposite faces of said package element toward each other at four spaced folding lines perpendicular to the longitudinal direction of said package element wherein the folding of the bottom of a package and the top of an adjoining package is carried out simultaneously, simultaneously effecting in a first pair of said faces a folding in the shape of triangular sections having their bases formed by the outer parallel folding lines of the latter pair, pressing said triangular sections flatly against the bottom portion of said shaping body, pressing the second pair of opposite faces of said package element against the bottom portion of said shaping body, and sealing the bottom of one package simultaneously with the sealing of the top of the adjoining package.

2. The method according to claim 1, wherein the said bottom portion of said shaping body is substantially plane, and said triangular sections and said second pair of opposite faces are pressed against this bottom portion of said shaping body to form a package with a substantially plane bottom.

3. The method according to claim 1, wherein the said bottom portion of said shaping body includes a recessed portion, and said triangular sections and said second pair of opposite faces are pressed against this bottom portion of said shaping body to form a package with a recessed bottom.

4. The method according to claim 1, including the steps of severing the two successive packages from one another and bending laterally toward the bottom, the lap projecting from the bottom of the package as a result of the severing operation.

5. The method according to claim 1, including the step of impressing on the web of material on the portion which forms the top of a package triangular shaped score lines for the purpose of facilitating forming of a projecting beak on opening of the top of the package.

6. The method according to claim 1, including the step of impressing score lines on the web in a pattern which at least partially corresponds to the folding lines of the material.

7. The method according to claim 1, including the steps of applying a line of glue to at least one of each pair of opposite faces of said package element and gluing said opposite faces together.

8. The method according to claim 7, wherein said line of glue is a series of glue spots.

9. The method according to claim 7, wherein said line of glue is a continuous line of glue.

10. The method according to claim 1, including the step of severing said adjoining packages while the package element is supported on said shaping body.

11. The method according to claim 10, wherein said squeezing operation is restricted to the central vertical section of the package.

12. A method of producing a package having a substantially rectangular cross-section, comprising the steps of shaping a web of sheet material around a square shaping body, sealing the longitudinal edges of said web to each other, engaging the thus formed substantially rectangular package element at the end of said shaping body with two pairs of jaws to cause pair-wise opposite faces of said package element to be folded toward each other along folding lines perpendicular to the longitudinal direction of said package element wherein the forming of the bottom of a package and of the top of an adjoining package is carried out simultaneously, effecting in one pair of said faces a folding to form triangular sections having their bases formed by the folding lines of the latter pair, moving said package element and said jaws relative to each other in a direction along the longitudinal direction of said package element during said folding operation to cause surfaces perpendicular to said longitudinal direction on a first pair of said jaws to engage said folding surfaces and press these folding surfaces until they form the bottom of a package while effecting the sealing of said bottom and said adjoining top.

13. The method according to claim 12, wherein the said surfaces perpendicular to said longitudinal direction on said first pair of jaws form a recess in said bottom of said package.

14. The method according to claim 12, including the step of severing the two successive packages from one another by displacing a pair of knives toward one another through cavities in said first pair of jaws.

15. The method according to claim 12, including the step of, after the bottom is sealed, filling the package through a hollow space in said shaping body.

16. A method of producing a package having a substantially square cross-section, comprising the steps of shaping a web of sheet material around a square shaping body, sealing the longitudinal edges of said web to each other, folding and sealing the substantially square package element thus formed at the end of said shaping body wherein folding of the bottom of a package and of the top-seal of an adjoining package is carried out simultaneously so that the package will have a substantially square cross-section, and forming a recess in the bottom portion of the package in connection with said folding and sealing operation while said shaping body serves as a support for said bottom portion, pair-wise opposite faces of said package element being folded towards each other at four spaced folding lines perpendicularly to the longitudinal direction of said package element, and simultaneously effecting in one pair of the faces a folding in the shape of triangles having the bases formed by both outermost parallel folding lines of the latter pair and the apexes directed toward each other and situated on the central points of both inner parallel folding lines, moving said triangle apexes on opposite package faces towards each other, at the same time as the central portions of said both faces between the two inner parallel folding lines are folded at central lines perpendicular to said folding lines, so as to move the folds thus formed along said latter central lines and along the inner parallel folding lines of the two pairs of faces in contact with each other, and sealing the bottom of one package simultaneously with the top of the adjoining package, whereupon the package element is displaced longitudinally along a distance approximately corresponding to the desired length of the package.

17. A method of producing a package having a substantially square cross-section, comprising the steps of shaping a web of sheet material around a square shaping body, sealing the longitudinal edges of said web to each other, folding and sealing the substantially square package element thus formed at the end of said shaping body wherein folding of the bottom of a package and of the top-seal of a subsequent package is carried out simultaneously so that the package will have a substantially square cross-section, and forming at least one of the corner edges of the package with double edges by a squeezing operation, pair-wise opposite faces of said package element being folded towards each other at four spaced folding lines perpendicularly to the longitudinal direction of said package element, and simultaneously effecting in one pair of the faces a folding in the shape of triangles having the bases formed by both outermost parallel folding lines of the latter pair and the apexes directed towards each other and situated on the central points of both inner parallel folding lines, moving said triangle apexes on opposite package faces towards each other, at the same time as the central portions of said both faces between the two inner parallel folding lines are folded at the central lines perpendicular to said folding lines, so as to move the folds thus formed along said latter central lines and along the inner parallel folding lines of the two pairs of faces in contact with each other, and sealing the bottom of one package simultaneously with the top of the subsequent package, whereupon the package element is displaced longitudinally along a distance approximately corresponding to the desired length of the package.

References Cited by the Examiner
UNITED STATES PATENTS

| | | | |
|---|---|---|---|
| 2,259,866 | 10/1941 | Stokes | 53—180 X |
| 3,006,121 | 10/1961 | Omori | 53—180 |
| 3,082,583 | 3/1963 | Larson et al. | 53—182 X |
| 3,091,902 | 6/1963 | Reinhardt et al. | 53—28 |

FRANK E. BAILEY, *Prinmary Examiner.*

S. ABEND, *Assistant Examiner.*